M. SIMONS.
Coffee Pot.
No. 62,697.
Patented March 5, 1867.
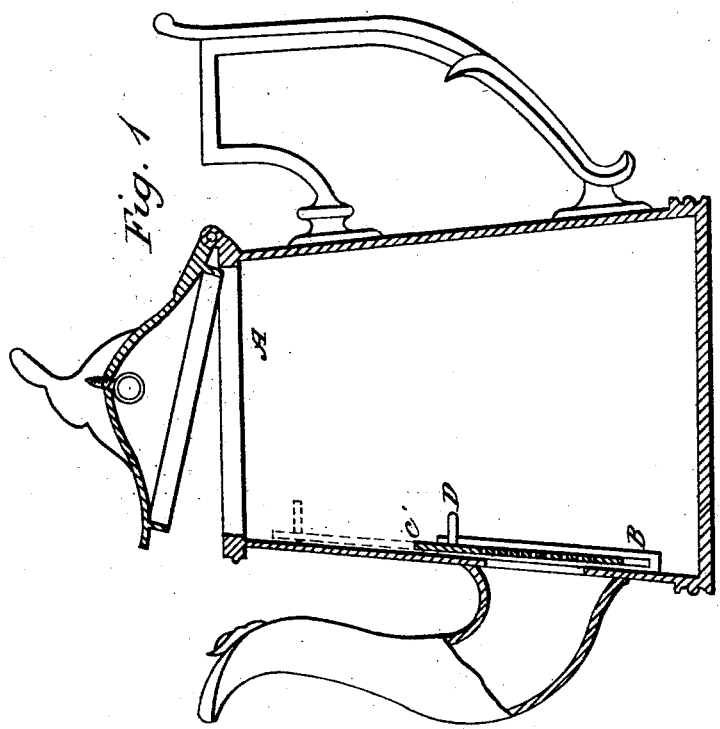

United States Patent Office.

MICHAEL SIMONS, OF MIDDLETOWN, CONNECTICUT.

Letters Patent No. 62,697, dated March 5, 1867.

STRAINER FOR COFFEE AND TEA-POTS.

*The Schedule referred to in these Letters Patent and making part of the same.*

TO ALL WHOM IT MAY CONCERN:

Be it known that I, MICHAEL SIMONS, of Middletown, Middlesex county, and State of Connecticut, have invented new and useful improvements in Strainers of Coffee and Tea-Pots; and I do hereby declare the following to be an exact description thereof, reference being had to the accompanying drawings, and to the letters of reference marked thereon, making a part of this specification, in which—

Figure 1 represents a sectional view of the coffee or tea-pot, with its strainer.

Figure 2 represents a view of the sliding strainer as operating in the coffee or tea-pot The nature of my invention consists in the slide, with its handle and its guides made of Britannia ware, for the purpose of preventing the slide and guides from rusting and adhering together, or destroying the flavor or taste of the tea or coffee.

A represents an ordinary coffee or tea-pot. B B are grooved guides made of Britannia ware, and are attached to each side of the aperture of the spout on the inside of the coffee-pot. C is the strainer, with a projection, D, as a short handle, for the purpose of raising and lowering the strainer, and removing it, when necessary, to be cleansed. The strainer C is made of Britannia ware, and slides up and down in the guides B B. It is perforated in the centre, to correspond with the aperture at the base of the spout.

The object of this movable strainer is to enable the housewife to remove the strainer and clean off the sediment that always collects and prevents the coffee or tea from being poured out clearly through the spout, and frequently choking up the spout in the ordinary coffee or tea-pots now in use. And by removing the strainer and cleaning it much other time and labor are saved. It is also indestructible and free from rust that corrodes tin slides and become tight, that cannot be removed, and spoil the taste of the tea or coffee.

What I claim as my invention, and desire to secure by Letters Patent, is—

The arrangement and combination of the movable strainer C, with its handle D and guides B, when made of Britannia ware, and attached to and operating on the inside of the base of the spout of a tea or coffee-pot, as herein described and for the purposes set forth.

MICHAEL SIMONS.

Witnesses:
HENRY J. NEARING,
JULIUS WARNER.